United States Patent [19]

Sekihara et al.

[11] 4,113,932
[45] Sep. 12, 1978

[54] PROCESS FOR POLYMERIZING VINYL CHLORIDE MONOMER

[75] Inventors: Takeshi Sekihara; Tomoyuki Emura; Masayuki Murashige, all of Niihama, Japan

[73] Assignee: Sumitomo Chemical Company, Limited, Osaka, Japan

[21] Appl. No.: 874,748

[22] Filed: Feb. 3, 1978

[30] Foreign Application Priority Data

Feb. 17, 1977 [JP] Japan .................................. 52-16834

[51] Int. Cl.$^2$ ............................................. C08F 14/06
[52] U.S. Cl. ..................................... 526/74; 526/204; 526/344; 526/345
[58] Field of Search ................. 526/74, 204, 344, 345

[56] References Cited

U.S. PATENT DOCUMENTS

| | | | |
|---|---|---|---|
| 2,973,361 | 2/1961 | Radner | 526/204 |
| 3,373,150 | 3/1968 | Pears et al. | 526/74 |
| 3,515,709 | 6/1970 | Nelson et al. | 526/74 |
| 3,669,946 | 6/1972 | Koyanagl et al. | 526/74 |
| 3,915,944 | 10/1975 | Burgess et al. | 526/74 |
| 3,923,765 | 12/1975 | Goetze et al. | 526/74 |
| 3,957,744 | 5/1976 | Deuschel et al. | 526/74 |
| 3,959,235 | 5/1976 | Nishigaki et al. | 526/204 |
| 3,962,196 | 6/1976 | Weimer et al. | 526/74 |
| 3,997,707 | 12/1976 | Aruga et al. | 526/74 |
| 4,029,616 | 6/1977 | Tajima et al. | 526/74 |
| 4,068,052 | 1/1978 | Weimer | 526/74 |

OTHER PUBLICATIONS

Summary of Japanese Patent Publication No. 4753/71 (Feb. 2, 1967).

Primary Examiner—Harry Wong, Jr.
Attorney, Agent, or Firm—Stevens, Davis, Miller & Mosher

[57] ABSTRACT

In a process for polymerizing vinyl chloride monomer by the polymerization of vinyl chloride alone or a mixture of vinyl chloride as a main component and a monomer copolymerizable therewith in an aqueous medium, an improvement which comprises carrying out said polymerization in the presence of a polycyclic nitrogen-containing compound of the formula,

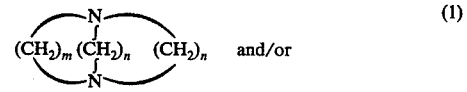 (1)

and/or

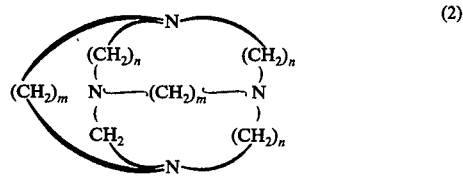 (2)

wherein $m$ and $n$ are each an integer of 1 to 3, the amount of said compound being 1 ppm to less than 100 ppm by weight based on said monomer or monomer mixture. By this process, it is possible to substantially prevent the formation of scale attached to the polymerization vessel and the like without damaging the physical properties of the produced vinyl chloride polymer.

6 Claims, No Drawings

PROCESS FOR POLYMERIZING VINYL CHLORIDE MONOMER

The present invention relates to a process for polymerizing vinyl chloride monomer.

More particularly, the present invention relates to a process for the polymerization of vinyl chloride alone or a mixture of vinyl chloride as a main component and a monomer copolymerizable therewith (referred simply to as "vinyl chloride monomer" hereinafter) in an aqueous medium, which comprises carrying out said polymerization in the presence of a particular polycyclic nitrogen-containing compound thereby substantially preventing the formation of scale attached to the inner wall (hereinafter referred to simply as "wall") of the polymerization vessel and the like without damaging the physical properties of the produced vinyl chloride polymer.

In the common suspension or emulsion polymerization of the vinyl chloride monomer in an aqueous medium, it is well known that a thin film-like or scale-like polymer deposit produced adheres to the wall of the polymerization vessel or the blade of the stirrer, the deposit being what is called scale. This scale lowers the cooling capacity of the polymerization vessel, and besides it markedly lowers the quality of the produced vinyl chloride polymer by contaminating the deposit, as is seen in the appearance of so-called fish eyes. For the removal of these bad effects, therefore, the polymerization vessel, from which the contents have been discharged after the polymerization, should be cleaned completely prior to the beginning of the next polymerization. Since, however, this cleaning requires much labor and time, the production capacity of the vessel is markedly lowered, and besides, when the scale is scratched off by hand by a workman in the vessel, the operation is very dangerous and undesirable in terms of sanitation.

Many methods have been proposed to prevent the formation of scale attached to the wall of a polymerization vessel.

For example, Japanese Patent Publication No. 37988/1970 discloses the following suspension polymerization of vinyl chloride: The aqueous system of vinyl chloride or a mixture of vinyl chloride and a vinyl monomer copolymerizable therewith is first converted to a dispersion system using a dispersing agent, for example a cellulose derivative or its mixture with other well-known dispersing agent; and then the pH of the dispersion system is made 8 or more by the addition of an alkali metal oxide or hydroxide, followed by suspension polymerization. This process surely displays the effect of preventing the scale formation to a certain degree, but it is not so effective as to be usable industrially.

Further, Japanese Patent Publication No. 40462/1972 and Japanese Patent Application Kokai (Laid Open) No. 44276/1975 disclose a process using a nitrite, and Japanese Patent Publication No. 4753/1971 discloses a process using a compound having an azine ring. These processes surely display the effect of preventing the scale formation. Since, however, both of them produce the polymer having an extremely inferior thermal stability, it is difficult to employ them industrially.

Still further, U.S. Pat. No. 3,669,946 discloses a process which includes coating the wall of a polymerization vessel with a dye, pigment or a compound having an azine ring. Also, there are proposed many processes which include coating said wall with other substances. These processes, however, require a troublesome and time-consuming step in which a dilute solution of a dye or the like is coated uniformly throughout the whole wall of the polymerization vessel and then dried. Since, moreover, the substance coated on the wall is dissolved partly in the monomer during the polymerization and consumed, it should be re-coated freshly every several batches. And, the substance dissolved in the monomer contaminates the produced polymer thereby causing a fatal drawback of markedly lowering the qualities of the polymer such as thermal stability.

For the reasons as described above, the inventors extensively studied a process which is capable of substantially preventing the scale formation and the like without damaging the qualities of the produced polymer. Thus, the inventors attained the present invention.

An object of the present invention is to provide an improved process for polymerizing vinyl chloride.

Another object of the present invention is to provide a process for polymerizing the vinyl chloride monomer which process is capable of substantially preventing the formation of scale attached to the wall of the polymerization vessel and the like without damaging the physical properties of the produced vinyl chloride polymer.

Other objects and advantages of the present invention will become apparent from the following descriptions.

According to the present invention, there is provided a process for polymerizing vinyl chloride alone or a mixture of vinyl chloride as a main component and a monomer copolymerizable therewith in an aqueous medium, which comprises carrying out said polymerization in the presence of a polycyclic nitrogen-containing compound of the formula,

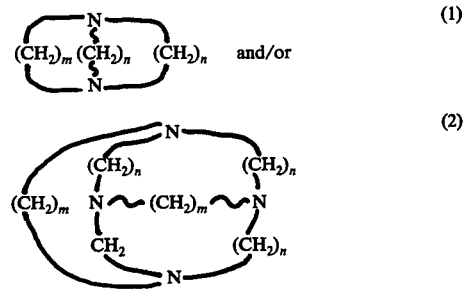

wherein $m$ and $n$ are each an integer of 1 to 3, the amount of said compound being 1 ppm to less than 100 ppm by weight based on said monomer or monomer mixture.

In the suspension polymerization of vinyl chloride, the mechanism by which the scale adheres to the wall of a polymerization vessel and the like, and the mechanism by which the attachment of the scale is efficiently prevented by the addition of the nitrogen-containing compound of the present invention, are not always clear, but they are presumed as follows: In the common polymerization of vinyl chloride, a small amount of hydrogen chloride is generated with the progress of the polymerization and dissolved in the aqueous medium to form a chloride ion; this ion corrodes the wall of the polymerization vessel to damage the smoothness of the wall surface, for example to cause a pitting corrosion; and, as a result, active sites convenient for the attachment of the scale are produced on the surface.

On the other hand, the followings may be considered in the case of the present invention: The particular polycyclic nitrogen-containing compounds have a steric, cage-like molecular structure, and they are strongly adsorbed to the active sites via the unpaired electron on the bridgehead tertiary nitrogen atom of the compounds; and thus, the adsorption of chloride ions and in turn the attachment of the scale are inhibited because of the steric structure of the cage-like molecule.

As the polycyclic nitrogen-containing compounds used in the present invention, there may be mentioned 1,4-diazabicyclo[2,2,2]octane, 1,5-diazabicyclo[3,2,2-]nonane, 1,3,5,7-tetraazaadamantane, 1,3,6,8-tetraazatricyclo[4.4.1.1$^{3,8}$]dodecane and the like. These compounds can be used alone or in combination. The compounds are added in an amount of 1 ppm to less than 100 ppm by weight, preferably 1 to 70 ppm by weight and particularly preferably 5 to 50 ppm by weight, based on the monomer. When the amount is less than 1 ppm, the effect of preventing the scale formation becomes insufficient and film-like scale comes to be produced on the wall of a polymerization vessel. When the amount is 100 ppm or more, a polymerization retarding effect appears and besides the thermal stability of the produced polymer is lowered.

As a method for adding these polycyclic nitrogen-containing compounds, said compound may be added to the polymerization system all at once before the beginning of polymerization, or one portion of said compound may be added before the beginning of polymerization and the remaining portion added as a solution by spraying it into a vapour phase part on the inner wall of the polymerization vessel during the polymerization.

The process of the present invention can be applied to the common suspension polymerization or emulsion polymerization in an aqueous medium, and its effect is particularly remarkable in the suspension polymerization. In the suspension polymerization of the present invention, oil-soluble catalysts and suspension stabilizers commonly used in the suspension polymerization of vinyl chloride are used. As the oil-soluble catalysts, there maybe mentioned diacyl peroxides (e.g. lauroyl peroxide), alkyl peroxyesters (e.g. t-butyl peroxypivalate), dialkyl peroxydicarbonates (e.g. diisopropyl peroxydicarbonate), acetylalkyl peroxides (e.g. acetylcyclohexylsulfonyl peroxide), azo type catalysts (e.g. azobis(2,4-dimethylvaleronitrile)), or mixtures thereof. But, the catalysts of the present invention are not limited to these compounds. The amount of catalyst used is the that commonly used in the suspension polymerization of vinyl chloride, and it is generally 0.005 to 0.5% by weight based on the monomer. As the suspension stabilizers, there is used water-soluble synthetic high molecular compounds (e.g. partially saponified polyvinyl alcohol), cellulose derivatives (e.g. hydroxypropoxymethyl cellulose), natural high molecular compounds (e.g. gelatin) or the like. In the emulsion polymerization of the present invention, water-soluble catalysts and emulsifiers commonly used in the emulsion polymerization of vinyl chloride are used. The water-soluble catalysts include persulfates (e.g. potassium persulfate), hydrogen peroxide and redox catalysts comprising these peroxides and a reducing agent. The emulsifiers include anionic surface active agents such as alkali metal alkylsulfates (e.g. sodium laurylsulfate), alkali metal alkylarylsulfonates (e.g. soium dodecylbenzenesulfonate) and the like.

The polymerization of the present invention is generally carried out at about 40° to about 80° C. and, if necessary, chain transferring agents or crosslinking agents may be added.

As the monomers copolymerizable with vinyl chloride which are used in the present invention, there may be mentioned monomers commonly used in the copolymerization with vinyl chloride, for example, $\alpha$-olefins (e.g. ethylene, propylene), vinyl halides other than vinyl chloride, vinylidene halides (e.g. vinylidene chloride), vinyl ethers (e.g. methyl vinyl ether, lauryl vinyl ether), vinyl esters (e.g. vinyl acetate) or the like. These monomers are generally used in an amount of 30% by weight or less, preferably 15% by weight or less, based on the total weight of the monomers.

The process of the present invention can be carried out by using common polymerization vessels, i.e., glass-lined vessels or stainless steel vessels, and the effect of the present invention is displayed more certainly by using the stainless steel vessels.

According to the process of the present invention as described above in detail, the formation of scale can be substantially prevented without lowering the qualities, for example, thermal stability, of the produced vinyl chloride polymers. By this process, cleaning of a polymerization vessel, from which the contents have been discharged after polymerization, becomes very easy. That is to say, the cleaning is achieved sufficiently by merely washing the wall surface of the polymerization vessel by a jet of low-pressure water of 50 kg/cm$^2$ or less. Consequently, the industrial importance of the present process is extremely great.

The present invention is illustrated in more detail below with reference to examples, but the invention is not limited thereto.

In the following examples, the state of scale attachment, the degree of fish eyes, the initial discoloration and thermal stability were evaluated by the following test methods.

State of Scale Attachment

After the polymerization is finished, the contents of the polymerization vessel are discharged, and the polymer and scale attached to the wall of the vessel are washed off by a jet of low-pressure water of 15 kg/cm$^2$ and weighed. Thereafter, the scale which could not be washed off by the above operation is scratched off by hand using a scraper and weighed. The total weight of the polymer and scale by the former operation is shown in the weight (A) of scale attached to the vessel immediately after discharge of the contents of the vessel. The weight of scale scratched off by hand is shown in the weight (B) of scale attached to the vessel after cleaning by a jet of low-pressure water of 15 kg/cm$^2$. The weight (A) includes the weight of the normal polymer loosely adhering to the wall of the vessel and the like, but the weight (B) indicates the weight of the real scale strongly adhering to the wall and the like.

Fish Eyes

Fifty grams of the vinyl chloride polymer, 25 g of dioctyl phthalate, 0.5 g of barium stearate and 0.5 g of cadmium stearate are well mixed in a beaker at room temperature. The mixture is kneaded on a roll mill at 150° C. for 7 minutes and formed into a film of 0.15 mm in thickness. The number of fish eyes per 100 cm$^2$ of the film is counted.

Initial Discoloration

The following compound is formed into sheet by kneading on a roll mill and pressing under the conditions described below. The degree of discoloration of the sheet is then visually observed and classified into the following ratings:
A: Standard
B: Slightly inferior
C: Very inferior

Thermal Stability

The following compound is formed into sheet by kneading on a roll mill and pressing under the conditions described below. The sheet is then heated at 180° C. in a Geer's oven. The thermal stability is expressed in the time required for the sheet to change to black.

| Compounding: | Parts by weight |
|---|---|
| Vinly chloride polymer | 100 |
| Calcium-zinc type composite stabilizer (Mark-37 produced by Adekaargus Chemical Co., Ltd.) | 1 |
| Epoxidized soybean oil (Adekacizer O 130P produced by Adekaargus Chemical Co., Ltd.) | 2 |
| Stearic acid | 1 |

Processing Conditions

Kneading 160° C. × 5 min.
Pressing 170° C. × 5 min.

Examples 1 and 2, and Reference examples 1 to 3

To a 100-liter stainless steel polymerization vessel were added 45 kg of a deionized water, 30 g of polyvinyl alcohol (degree of saponification 80%, mean degree of polymerization 1700), 7.5 g of di-tert-butylcyclohexyl peroxydicarbonate and 1,4-diazabicyclo[2,2,-2]octane. The amount of 1,4-diazabicyclo[2,2,2]octane was varied as shown in Table 1.

After the vessel was evacuated, 30 kg of vinyl chloride monomer was charged into the vessel and polymerization was carreid out at 57° C. with stirring. The pressure in the vessel at the beginning of the polymerization was 8.7 kg/cm²G. When the pressure dropped down to 6.7 kg/cm²G, the polymerization was stopped and the unreacted vinyl chloride monomer was recovered. Thereafter, the contents of the vessel was discharged and dried to obtain a vinyl chloride polymer having a mean polymerization degree of 1100 at a conversion of 85%.

In Examples 1 and 2 according to the process of the present invention, the polymer adhering to the wall of the vessel after discharge of the contents was extremely small in amount, and it could be removed easily and completely by a jet of low-pressure water of 15 kg/cm². Further, the vinyl chloride polymers obtained in these Examples showed excellent qualities in the particle size distribution test, fish eye test, and initial discoloration and thermal stability tests as shown in Table 1.

Contrary to this, in Reference examples 1 and 2 wherein the polycyclic nitrogen-containing compound of the present invention was not added, or, if added, its amount was insufficient, the amount of scale attached was large and the result of the fish eye test was also inferior. Also, in Reference example 3 wherein the amount of the polycyclic nitrogen-containing compound added was above the range of the present invention, the effect of preventing the scale attachment was observed. But, it resulted in the polymerization time being prolonged, and the initial discoloration and thermal stability were lowered in the processing test.

Table 1

| Number | Additive Kind | Amount added (ppm) | Polymerization time (hr) | Amount of Scale attached (g/m²) (A) Immediately after discharge of the contents | (B) After cleaning by a jet of low-pressure water of 15kg/cm² |
|---|---|---|---|---|---|
| Reference example 1 | Not added | 0 | 6.5 | 250 | 110 |
| Reference example 2 | 1,4-Diazabicyclo-[2,2,2]octane | 0.3 | 6.5 | 130 | 30 |
| Example 1 | " | 10 | 6.7 | 30 | 0 |
| Example 2 | " | 30 | 7.0 | 20 | 0 |
| Reference example 3 | " | 300 | 11.5 | 20 | 0 |

| Particle size distribution (weight percent) | | | Fish eye (Number/100cm²) | Initial discoloration | Thermal stability (min.) |
|---|---|---|---|---|---|
| 42-Mesh through | 100-Mesh through | 250-Mesh through | | | |
| 99.7 | 71.2 | 0.5 | 750 | A | 60 |
| 99.5 | 73.5 | 0.3 | 64 | A | 60 |
| 99.8 | 71.8 | 0.7 | 3 | A | 55 |
| 98.7 | 72.7 | 0.3 | 1 | A | 50 |
| 97.3 | 76.8 | 0.9 | 5 | B | 40 |

EXAMPLES 3 TO 5, AND REFERENCE EXAMPLES 4 TO 6

To a 100-liter stainless steel polymerization vessel were added 45 kg of a deionized water, 30 g of polyvinyl alcohol (degree of saponification 80%, mean degree of polymerization 1700), 9 g of α,α'-azobis-(2,4-dimethylvaleronitrile) and the additive as shown in Table 2.

The amount of the additive was as shown in Table 2.

After the vessel was evacuated, 30 kg of vinyl chloride monomer was charged into the vessel and polymerization was carried out at 64° C. with stirring. The pressure in the vessel at the beginning of the polymerization was 10.2 kg/cm²G. When the pressure dropped down to 7.2 kg/cm²G, the polymerization was stopped and the unreacted vinyl chloride monomer was recovered. Thereafter, the contents of the vessel was discharged and dried to obtain a vinyl chloride polymer having a mean polymerization degree of 850 at a conversion of 90%.

In Examples 3 to 5 according to the process of the present invention, the polymer adhering to the wall of the vessel after discharge of the contents was extremely small in amount, and it could be removed easily and completely by a jet of low-pressure water of 15 kg/cm². Further, the vinyl chloride polymers obtained in these Examples showed excellent qualities in the particle size distribution, fish eye, initial discoloration and thermal stability tests as shown in Table 2. Contrary to this, in Reference example 4 wherein tri-n-amylamine which is a tertiary amine outside the scope of the present invention was added, the effect of preventing the scale attachment was not observed, and the result of the fish eye test was also inferior. In Reference examples 5 and 6 wherein morpholine and sodium hydroxide were added, respectively, the effect of preventing the scale attachment was observed to some extent, but the results of the particle size distribution, fish eye, initial discoloration and thermal stability tests were all extremely inferior.

Table 2

| Additive | | | Immediately polymerization time hr | Amount of scale attached (g/m²) | |
|---|---|---|---|---|---|
| | Polymeri- | | | (A) After cleaning | (B) |
| Number | Kind | Amount added (ppm) | | after discharge of the contents | by a jet of low-pressure water of 15 kg/cm² |
| Example 3 | 1,5-Diazabicyclo [3,2,2]nonane | 10 | 7.7 | 50 | 0 |
| Example 4 | 1,3,6,8-Tetraaza-tricyclo[4.4.1.1³,⁸]dodecane | 10 | 7.3 | 10 | 0 |
| Example 5 | 1,3,5,7-Tetraaza-adamantane | 10 | 8.0 | 30 | 0 |
| Reference example 4 | Tri-n-amylamine | 10 | 18.0 | 350 | 150 |
| Reference example 5 | Morpholine | 10 | 8.5 | 110 | 20 |
| Reference example 6 | Sodium hydroxide | 300 | 10.8 | 250 | 10 |

| Particle size distribution (weight percent) | | | Fish eye (number/100cm²) | Initial discoloration | Thermal stability (min.) |
|---|---|---|---|---|---|
| 42-Mesh through | 100-Mesh through | 250-Mesh through | | | |
| 99.3 | 70.0 | 0.1 | 15 | A | 55 |
| 99.8 | 68.3 | 0.2 | 1 | A | 60 |
| 98.5 | 65.2 | 0.8 | 27 | A | 50 |
| 89.2 | 35.7 | 6.7 | 1200 | C | 40 |
| 93.7 | 71.3 | 0.5 | 300 | C | 35 |
| 53.9 | 26.3 | 10.8 | 1500 | C | 40 |

EXAMPLE 6

To a 100-liter stainless steel polymerization vessel were added 45 kg of a deionized water, 24 g of potassium persulfate, 80 g of sodium laurylsulfate and 1.7 g of 1,3,5,7-tetraazaadamantane. After the vessel was evacuated, 34 kg of vinyl chloride monomer was charged into the vessel and polymerization was carried out at 53° C. with stirring. When 1 kg/cm² of the pressure in the vessel decreased, the polymerization was stopped, the unreacted vinyl chloride monomer was recovered and then the contents of the vessel were discharged. Thus, a vinyl chloride polymer having a mean particle size of 0.4μ was obtained in the form of latex. After the contents of the vessel were discharged, the amount of scale adhering to the wall of the vessel was only 170 g/m², and it was further reduced to only 7 g/m² after the vessel was cleaned by a jet of low-pressure water of 15 kg/cm².

REFERENCE EXAMPLE 7

Polymerization was carried out in the same manner as in Example 6 except that 1,3,5,7-tetraazaadamantane was not added. Thus, a vinyl chloride polymer having a mean particle size of 0.4μ was obtained in the form of latex. After the contents of the vessel were discharged, however, the amount of scale adhering to the wall of the vessel was as large as 500 g/m², and 150 g/m² of the scale still remained on the wall surface even after the vessel was cleaned by a jet of low-pressure water of 15 kg/cm².

What is claimed is:

1. In a process for polymerizing vinyl chloride alone or a mixture of vinyl chloride as a main component and a monomer copolymerizable therewith in an aqueous medium, an improvement which comprises carrying out said polymerization in the presence of a polycyclic nitrogen-containing compound of the formula,

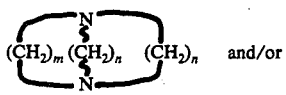 (1)

and/or

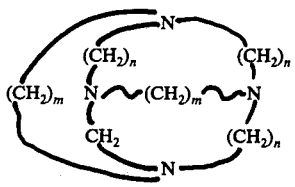 (2)

wherein $m$ and $n$ are each an integer of 1 to 3, the amount of said compound being 1 ppm to less than 100 ppm by weight based on said monomer or monomer mixture.

2. A process according to claim 1, wherein the amount of said polycyclic nitrogen-containing compound is 1 to 70 ppm.

3. A process according to claim 2, wherein the amount of said polycyclic nitrogen-containing compound is 5 to 50 ppm.

4. A process according to claim 1, wherein said polycyclic nitrogen-containing compound is a member selected from the group consisting of 1,4-diazabicyclo[2,2,2]octane, 1,5-diazabicyclo[3,2,2]nonane, 1,3,5,7-tetraazaadamantane and 1,3,6,8-tetraazatricyclo[4.4.1.1$^{3,8}$] dodecane.

5. A process according to claim 1, wherein said polymerization is carried out by suspension polymerization.

6. A process according to claim 1, wherein said polymerization is carried out in a polymerization vessel made of stainless steel.

* * * * *